United States Patent
Kwon (10) Patent No.: US 7,828,221 B2
(45) Date of Patent: Nov. 9, 2010

(54) RFID ANTENNA AND RFID TAG

(75) Inventor: Hong Il Kwon, Gwangmyeong-si (KR)

(73) Assignee: LG Innotek Co., Ltd., Seoul (KR)

( * ) Notice: Subject to any disclaimer, the term of this patent is extended or adjusted under 35 U.S.C. 154(b) by 110 days.

(21) Appl. No.: 12/067,474

(22) PCT Filed: Apr. 16, 2007

(86) PCT No.: PCT/KR2007/001832

§ 371 (c)(1),
(2), (4) Date: Mar. 20, 2008

(87) PCT Pub. No.: WO2007/119992

PCT Pub. Date: Oct. 25, 2007

(65) Prior Publication Data

US 2009/0224056 A1 Sep. 10, 2009

(30) Foreign Application Priority Data

Apr. 19, 2006 (KR) .............. 10-2006-0035331
Apr. 27, 2006 (KR) .............. 10-2006-0037909

(51) Int. Cl.
*G06K 19/06* (2006.01)
*G06K 7/08* (2006.01)
*H01Q 7/00* (2006.01)

(52) U.S. Cl. ............ 235/492; 235/451; 340/572.1; 343/866; 343/867

(58) Field of Classification Search ............ 235/375, 235/380, 382, 451, 487, 492; 340/572.1; 343/866, 867
See application file for complete search history.

(56) References Cited

U.S. PATENT DOCUMENTS

| | | | |
|---|---|---|---|
| 6,285,342 B1 * | 9/2001 | Brady et al. | 343/895 |
| 6,861,993 B2 | 3/2005 | Waldner et al. | |
| 6,992,630 B2 * | 1/2006 | Parsche | 343/700 MS |
| 7,004,399 B2 | 2/2006 | Maeda et al. | |
| 7,154,449 B2 * | 12/2006 | Liu et al. | 343/867 |
| 7,408,467 B2 * | 8/2008 | Kai | 340/572.7 |
| 2002/0167450 A1 | 11/2002 | Korden et al. | |
| 2005/0001026 A1 * | 1/2005 | Maeda et al. | 235/382 |
| 2007/0011048 A1 * | 1/2007 | Naito | 705/14 |

FOREIGN PATENT DOCUMENTS

JP 07-221538 8/1995

* cited by examiner

*Primary Examiner*—Thien M. Le
*Assistant Examiner*—Tuyen K Vo
(74) *Attorney, Agent, or Firm*—Saliwanchik, Lloyd & Saliwanchik

(57) ABSTRACT

Provided are a radio frequency identification (RFID) antenna and an RFID tag including the RFID antenna. The RFID antenna includes an electric conductor and a conductor that radiate electromagnetic fields isotropically. The RFID tag including the RFID antenna can be installed on a metal plate.

12 Claims, 7 Drawing Sheets

RFID ANTENNA AND RFID TAG

CROSS-REFERENCE TO RELATED APPLICATION

This application is the U.S. national stage application of International Patent Application No. PCT/KR2007/001832, filed Apr. 16, 2007, the disclosure of which is hereby incorporated by reference in its entirety.

TECHNICAL FIELD

Embodiments of the present invention relate to a radio frequency identification (RFID) antenna and an RFID tag.

BACKGROUND ART

Generally, RFID systems interchange various data with each other using radio waves at a predetermined bandwidth.

An RFID system includes a tag (or transponder) and a reader (or interrogator). The tag includes unique identification information. The tag is attached to an object or an animal, for example. The reader reads/writes identification information from/to the tag.

The reader can recognize, track, and manage the tag attached to, for example, a product, an animal, or a person by a contact or non-contact manner. Further, the reader can record information to the tag.

Figure 1:
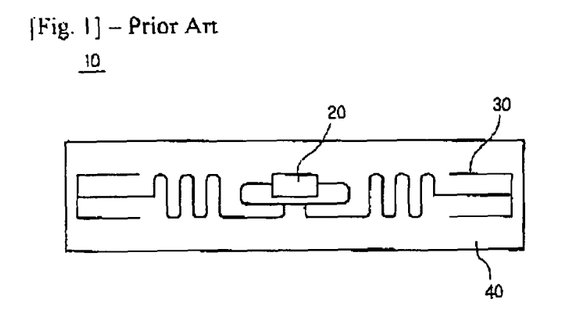
FIG. 1 illustrates a radio frequency identification (RFID) tag according to the related art.

FIG. 1 illustrates an RFID tag 10 according to the related art.

Referring to FIG. 1, the RFID tag 10 includes a semiconductor chip 20 and an antenna 30. The semiconductor chip 20 transmits or receives radio wave frequencies through the antenna 30.

The RFID tag 10 reflects a signal of a predetermined radio frequency (RF) band which is transmitted from an RFID reader (not shown). Here, the RFID tag 10 modulates the RF signal to add identification information and transmits to the RFID reader.

The antenna 30 of the RFID tag 10 is formed on an insulation film 40 in the form of a dipole antenna by printing. Therefore, a null exists in a certain direction of the dipole-type antenna 30 where a radiation pattern is not formed, and thus the RFID tag 10 cannot normally communicate with an RFID reader in the null direction.

DISCLOSURE OF INVENTION

Technical Problem

An embodiment provides an antenna having an isotropic radiation pattern and a radio frequency identification (RFID) tag including the antenna.

An embodiment provides an antenna using inductive coupling and an RFID tag including the antenna.

An embodiment provides an antenna that can be mounted on a metal plate, and an RFID tag including the antenna.

Technical Solution

An embodiment provides a radio frequency identification antenna comprising: a closed loop shaped electric conductor to which electric power is supplied; and an open loop shaped conductor at outer side of the electric conductor with no electric contact with the electric conductor.

An embodiment provides a radio frequency identification tag comprising: an antenna including a closed loop shaped electric conductor to which electric power is supplied and an open loop shaped conductor at outer side of the electric conductor with no electric contact with the electric conductor; and a semiconductor chip electrically connected to a feeding point of the electric conductor.

An embodiment provides a radio frequency identification tag comprising: a dielectric body; a planar antenna on the dielectric body and including a slot; and a semiconductor chip in the dielectric body and having an end electrically connected to the antenna.

ADVANTAGEOUS EFFECTS

According to the RFID antenna and RFID tag of the exemplary embodiments, the RFID tag does not have a null direction in which the RFID tag cannot communicate with a reader, and thus the RFID tag can be reliably applied to a product.

Furthermore, since the RFID antenna of the RFID tag is formed into a simple planar shape by printing, the RFID tag can be easily manufactured.

In addition, the RFID tag can be used with less restriction in installation position, so that an RFID system with the RFID tag can be conveniently and reliably used.

In addition, since the RFID antenna is formed with a slot, the size or length of the RFID antenna can be reduced.

Moreover, the RFID tag can be mounted even on a metal plate, thereby increasing the applicability of the RFID tag.

BEST MODE FOR CARRYING OUT THE INVENTION

A radio frequency identification (RFID) antenna and an RFID tag will now be described with reference to exemplary embodiments.

First Embodiment

Figure 2:
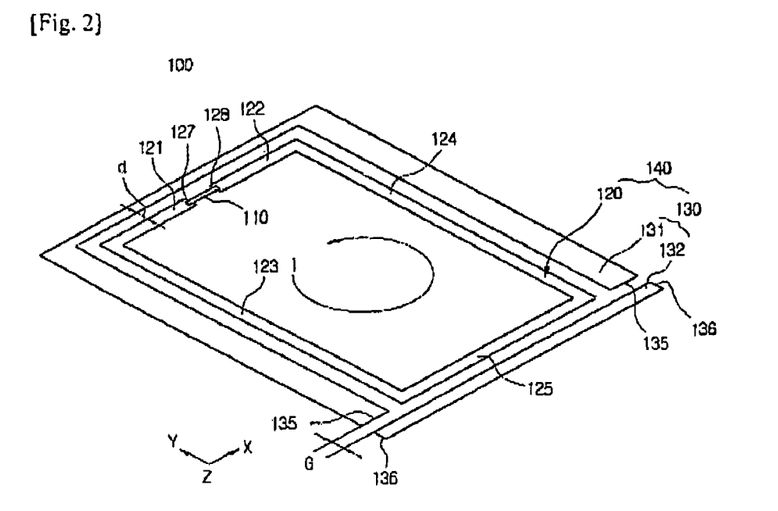
FIG. 2 illustrates an RFID tag according to a first embodiment.

FIG. 2 illustrates an RFID tag 100 according to a first embodiment.

Referring to FIG. 2, the RFID tag 100 includes a semiconductor chip 110 and an antenna 140. The antenna 140 includes an electric conductor 120 and a plurality of conductors 130.

The semiconductor chip 110 is an integrated circuit (IC) chip and includes a radio frequency (RF) transmission/reception circuit, a control logic, and a memory. The semiconductor chip 110 receives or transmits radio frequencies through the antenna 140.

Conductive contact members, such as straps, are formed on feeding points (for example, a point where electric power is supplied) 127 and 128 of the electric conductor 120. The semiconductor chip 110 is mounted on the conductive contact members.

The electric conductor 120 is a main body of the antenna 140 and has an elliptical or polygonal (e.g., rectangular and pentagonal) shape. The electric conductor 120 forms a closed loop except for the feeding points 127 and 128. The electric conductor 120 and the conductor 130 can be formed of the same material. The electric conductor 120 is electrically connected to the semiconductor chip 110, and the conductor 130 is not electrically connected to the semiconductor chip 110.

A current flows through the electric conductor 120. The electric conductor 120 includes first lines 121 and 122 connected to the semiconductor chip 110, second lines 123 and 124 connected to both ends of the first lines 121 and 122, and a third line 125 connected to both ends of the second lines 123 and 124. The first lines 121 and 122 are disposed in correspondence with the third line 125, and the second lines 123 and 124 correspond to each other. The first lines 121 and 122 and the second lines 123 and 124 are about 60 to 80% of the electric conductor 120 in length.

The conductor 130 is electrically divided into at least two parts having the form of an open loop. The conductor 130 is not electrically connected to the electric conductor 120. The conductor 130 is formed at outer side of the electric conductor 120.

The conductor 130 includes a first conductor 131 and a second conductor 132. The first conductor 131 corresponds to the first and second lines 121, 122, 123, and 124 of the electric conductor 120. The second conductor 132 corresponds to the first conductor 131 and the third line 125. The first to third lines 121 to 125 of the electric conductor 120 is spaced apart from the conductor 130 by a distance (d). The distance (d) may be constant or varied for each line.

Both ends 135 of the first conductor 131 are spaced a predetermined gap (G) from the second conductor 132. The gap (G) is an electrically opened region. The gap (G) may be equal to the distance between the third line 125 of the electric conductor 120 and the second conductor 132.

The second conductor 132 may be formed in straight shape, or both ends 136 of the second conductor 132 can be bent. The second conductor 132 is longer than the third line 125 extending in an X-axis direction, and both ends 136 of the second conductor 132 can be located inside or outside of extension lines drawn from both ends of the first conductor 131 in parallel with a Y axis.

The conductor 130 and the electric conductor 120 can be formed in same shape or similar line shape. For example, the conductor 130 and the electric conductor 120 can be formed of a polygonal or elliptical line in a symmetric or asymmetric pattern. Furthermore, the conductor 130 and the electric conductor 120 can change in line width according to desired characteristics of the antenna 140.

A feeding current (i) supplied from the semiconductor chip 110 may flow through the electric conductor 120 clockwise or counterclockwise. Then, a signal energy of a radio frequency is gradually emitted from the lines 121, 122, 123, 124, and 125 of the electric conductor 120 toward the conductor 130 in the form of electric and magnetic fields. As a result, a coupling phenomenon is occurred at the conductor 130 by the signal energy of the electric conductor 120.

In other words, electric energy is transferred between the electric conductor 120 and the conductor 130 by mutual inductively coupled type, an inductive coupling is occurred. The capacitance of the semiconductor chip 110 can be reduced, and the resonant frequency of the semiconductor chip 110 can be widened owing to the inductive coupling between the conductor 130 and the electric conductor 120.

In the REID tag 100 of the embodiment, a current supplied from the semiconductor chip 110 to the electric conductor 120 excites the conductor 130, resulting in inductive coupling. The inductive coupling is most intensive around the most distant third line 125 from the semiconductor chip 110.

An input resistance component of a feeding part of the antenna 140 is proportionate in reciprocal number of a conductor resistance. The input resistance component can be adjusted by an inductive coupling coefficient between the electric conductor 120 and the conductor 130. Therefore, a decrease in input resistance caused by antenna miniaturization can be solved. Furthermore, the inductance of the electric conductor 120 can be easily adjusted according to the size and location of the feeding part of the antenna 140.

The mutual inductively coupled coefficient can be expressed as follows:

$$M = \frac{\mu_0}{2\pi} l_b \ln\left(1 + \frac{l_a}{d}\right)$$

where, $\mu_0$ denotes free space permeability, $l_b$ denotes the length of the electric conductor 120 in the Y-axis direction, $l_a$ denotes the length of the electric conductor 120 in the X-axis direction, and d denotes the distance between the electric conductor 120 and the conductor 130.

The impedance of a feeding loop can be expressed as follows:

$$Z_{loop} = j2\pi f L_{loop}$$

where, $L_{loop}$ denotes the self inductance of the feeding loop.

In the antenna 140 of the RFID tag 100, an input impedance component is a function of only the mutual inductively coupled coefficient (M), and a reactance component is a function of only the inductance $L_{loop}$ of the feeding loop. Therefore, the distance between the electric conductor 120 and the conductor 130 can be adjusted according to the mutual inductively coupled coefficient.

Figure 3:
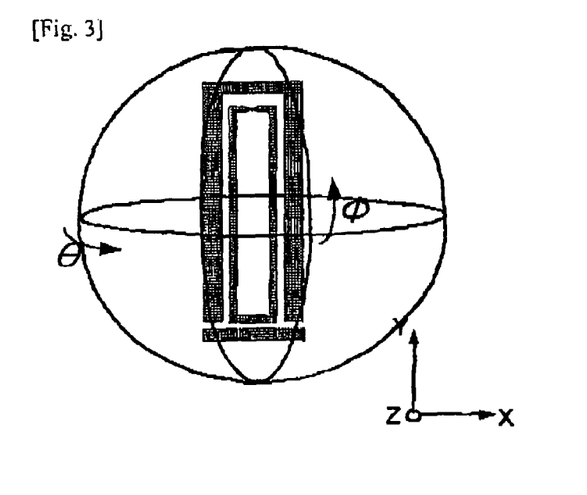
FIG. 3 illustrates a radiation pattern of an RFID antenna according to the first embodiment.
Figure 4:
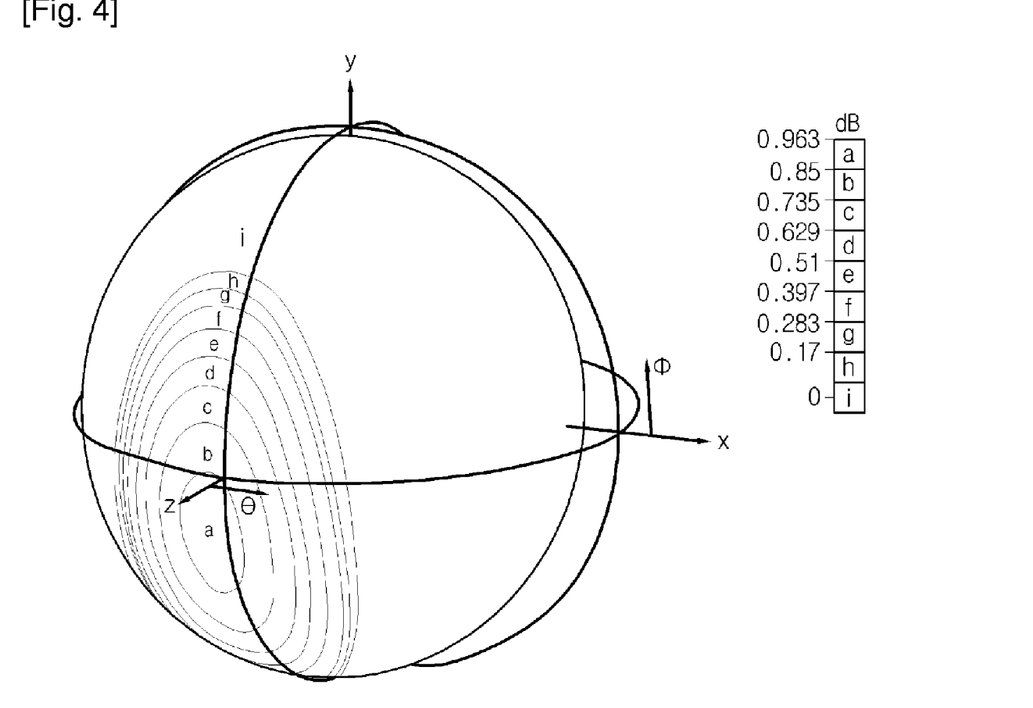
FIG. 4 illustrates a radiation pattern of an RFID antenna in a three-dimensional manner according to the first embodiment.

FIGS. 3 and 4 illustrate radiation patterns of an antenna of an RFID tag according to the first embodiment.

Referring to FIG. 3, the antenna of the RFID tag has an isotropic radiation pattern. The radiation pattern is generated by inductance coupling between an electric conductor and a conductor. A horizontal component of the radiation pattern is generated by lines of the antenna parallel with the Z and X axes, and a vertical component of the radiation pattern is generated by lines of the antenna parallel with the Y axis. θ denotes an angle on the XY plane, and φ denotes an angle measured with respect to the Y axis.

FIG. 4 illustrates a radiation pattern of an antenna of an RFID tag in a three-dimensional manner according to the first embodiment. Referring to FIG. 4, the antenna has an isotropic radiation pattern with respect to X, Y, and Z directions. Therefore, when the RFID tag communicates with an RFID reader, almost no null region is formed, and thus the RFID tag can communicate with an RFID reader in all directions.

Figure 5:
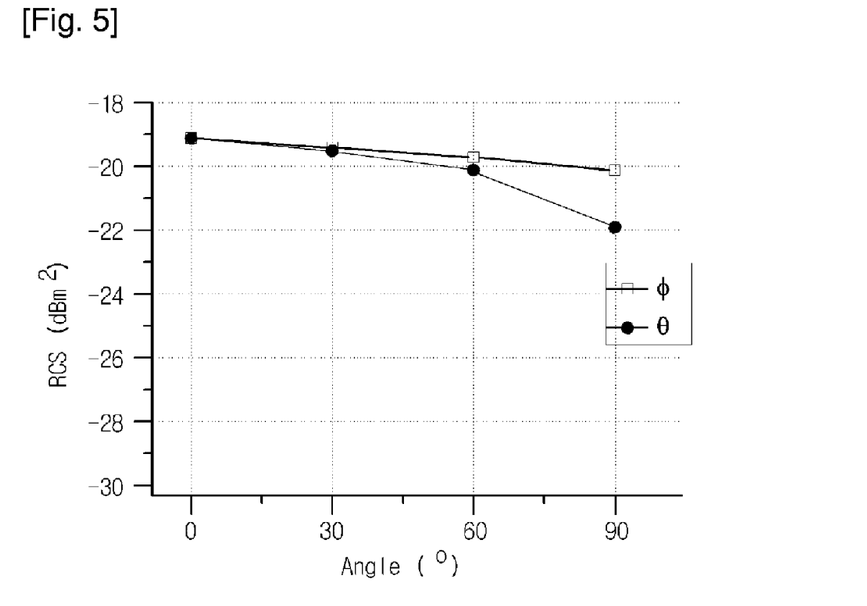
FIG. 5 is a graph illustrating response characteristics of an RFID antenna according to the first embodiment.

FIG. 5 is a graph for illustrating a radar cross section (RCS) of an antenna of an RFID tag according to the first embodiment. The RCS is the amount of reflection from the antenna measured while changing the angle θ of an RFID reader with respect to the RFID tag by 0°, 30°, 60°, and 90°, and the angle φ of the RFID reader with respect to the RFID tag by 0°, 30°, 60°, and 90°. As shown in FIG. 5, the reflection from the antenna of the RFID tag to the RFID reader is almost constant in all directions.

Figure 6:
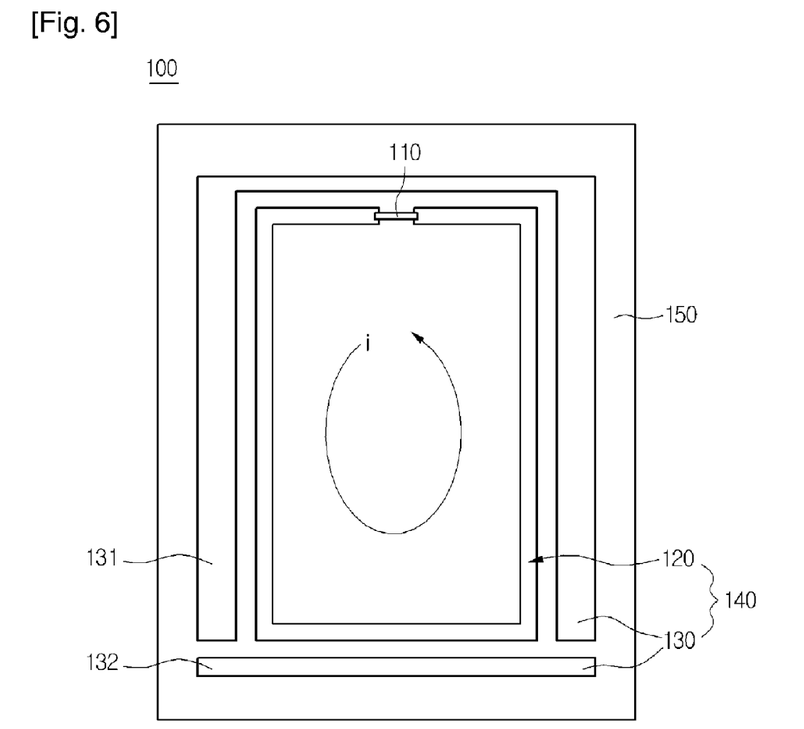
FIG. 6 illustrates an application example of an RFID tag according to the first embodiment.

FIG. 6 illustrates an RFID tag 100 mounted on a base member 150 according to the first embodiment.

Referring to FIG. 6, the RFID tag 100 is mounted on a front surface or back surface of the base member 150. A pattern is formed on the base member 150 using conductive paste by a screen printing method to form an antenna 140. Thus, an electric conductor 120 and a conductor 130 of the antenna 140 can be formed on the same plane.

The base member 150 is formed of a flexible non-conductive material. For example, the flexible non-conductive material includes polyethylene terephthalate (PET), polyimide (PI), polyethylene naphthalate (PEN), polyvinyl chloride (PVC), paper, acetate, polyester, polyethylene, polypropylene, polypropylene with calcium carbonate, acrylonitrile butadiene styrene (ABS), or plastic. The base member 150 can be formed of one or more of the listed materials or a combination thereof. The antenna 140 mounted on the base member 150 can have various shapes, such as polygonal and elliptical shapes, according to the purpose of the RFID tag 100.

Furthermore, the base member 150 including the RFID tag 100 can be covered with an insulation cover sheet (not shown). The cover sheet can be formed of a material equal to or similar to that of the base member 150. For example, the cover sheet can be formed of a thermoplastic material using heat and pressure. Since the RFID tag 100 is interposed between the base member 150 and the cover sheet, the RFID tag 100 can be protected from environmental agents such as impacts and moisture. Furthermore, in the embodiment, the antenna 140 can be formed by forming an electric conductor (or a conductor) on the base member 150, forming a conductor (or an electric conductor) on the cover sheet, and bonding the base member 150 and the cover sheet together.

Figure 7:
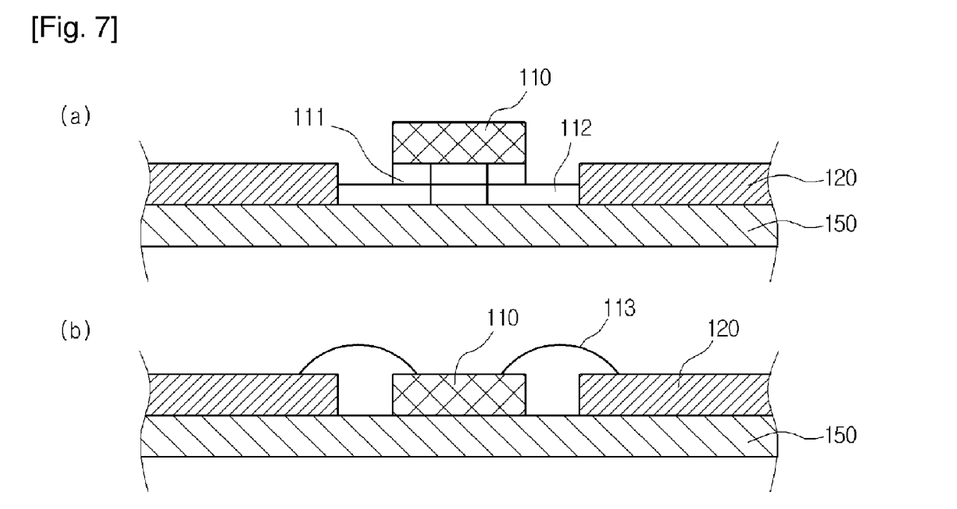
FIG. 7 illustrates mounting of a semiconductor chip according to the first embodiment.

FIG. 7 illustrates mounting of a semiconductor chip 110 according to the first embodiment.

As shown in (a) of FIG. 7, the semiconductor chip 110 can be mounted on a conductive pad 111 connected to an electric conductor 120 by a flip-chip method. Alternatively, as shown in (b) of FIG. 7, the semiconductor chip 110 can be connected to the electric conductor 120 by wires 113. That is, the semiconductor chip 110 and the electric conductor 120 can be electrically connected by a flip-chip method, a wire connection method, or other methods according to applications.

Figure 8:
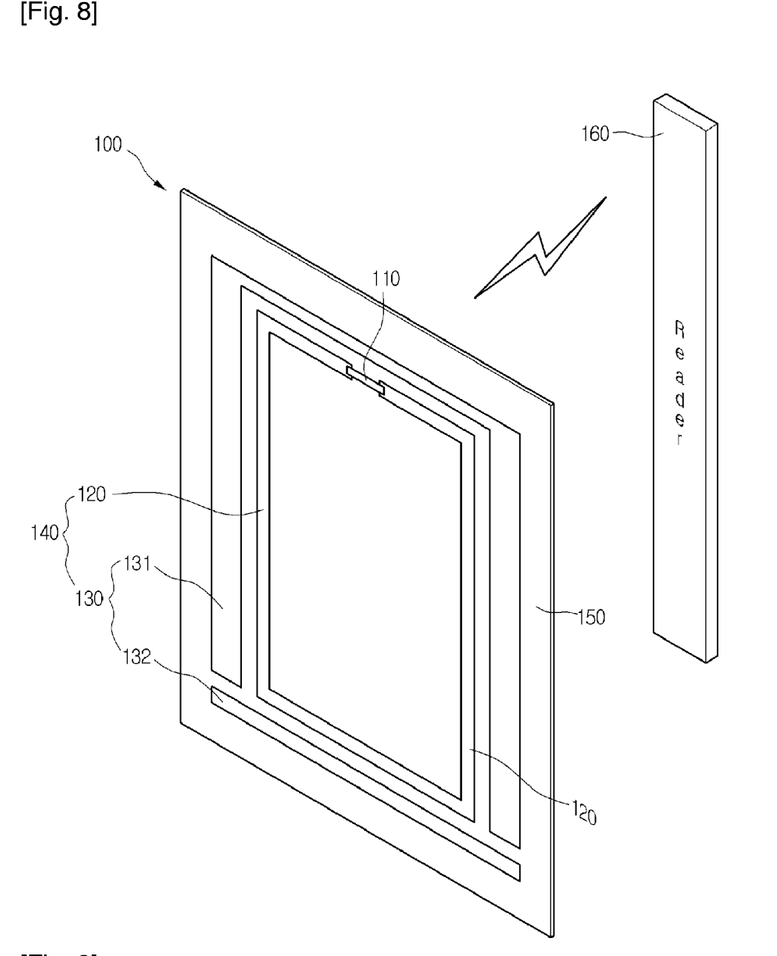
FIG. 8 illustrates an RFID system including a reader and the RFID tag of FIG. 6.

FIG. 8 illustrates an RFID system according to the first embodiment.

Referring to FIG. 8, the RFID system includes an RFID tag (or Transponder) 100 and a reader (or an interrogator) 160. The RFID tag 100 and the reader 160 communicate with each other using a short range wireless communication band. The short range wireless communication band is an UHF band, for example, 860 to 950 MHz. The RFID system can use various wireless communication bands according to applications. That is, the embodiment is not limited to UHF band.

The RFID tag 100 is mounted on a base member 150 and communicates with the reader 160 by a contact or non-contact method. The RFID tag 100 transmits data (e.g., identification information) stored in a memory by a backscatter communication scheme.

The RFID tag 100 may be an active RFID tag including a battery or a passive RFID tag not including an internal power source (e.g., a battery). In the latter case, the RFID tag 100 may operate using electric wave energy from the reader 160.

FIGS. 9 to 13 illustrate modification examples of an RFID antenna according to the first embodiment. The RFID antennas illustrated in FIGS. 9 to 13 are exemplary ones. That is, the RFID antenna of the present invention can have various structures according to applications.

Figure 9:
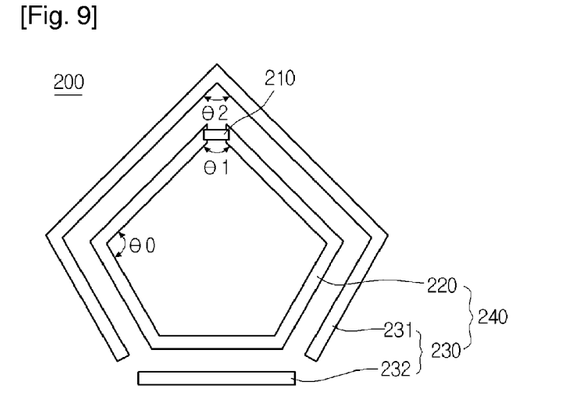
FIGS. 9 to 13 illustrate modification examples of an RFID antenna according to the first embodiment.

Referring to FIG. 9, an RFID tag 200 includes a semiconductor chip 210 and a pentagonal antenna 240. The antenna 240 includes an electric conductor 220 and a conductor 230 that are formed into a dual pentagonal pattern.

The electric conductor 220 may have internal angles θ0 and θ1 in the range from 60° to 120°. The conductor 230 has an internal angle θ2 determined by the internal angles of the electric conductor 220. One of internal angles of the electric conductor 220 or the conductor 230 may be in the range of, for example, 60° to 320° in order to minimize electric wave interference between neighboring lines.

Figure 10:
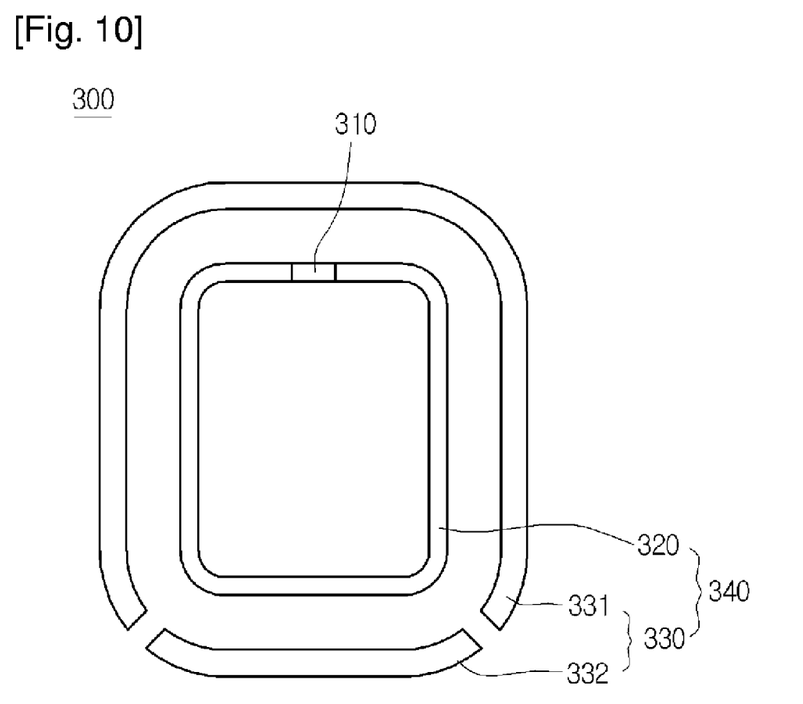

Referring to FIG. 10, an RFID tag 300 includes a semiconductor chip 310 and an antenna 340 having a rounded rectangular shape. The antenna 340 includes an electric conductor 320 and a conductor 330. The electric conductor 320 or the conductor 330 is rounded at corners. The conductor 330 includes a first conductor 331 and a second conductor 332. The conductor 330 can be formed into a predetermined shape, such as elliptical, rhombus, and trapezoidal shapes, with at least one smoothly curved portion.

Figure 11:
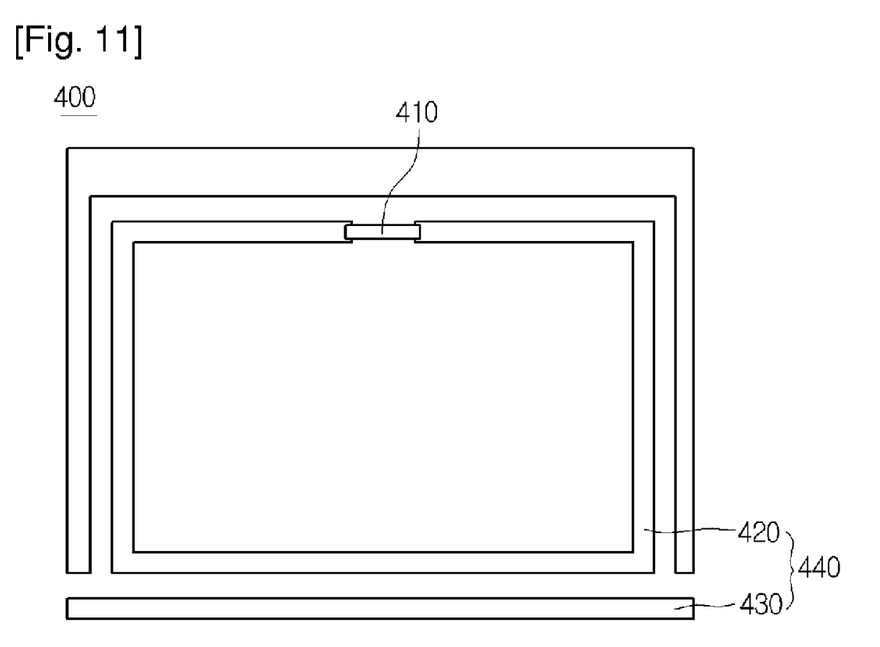

Referring to FIG. 11, an RFID tag 400 includes a semiconductor chip 410 and an antenna 440 having a predetermined aspect ratio. The antenna 440 includes an electric conductor 420 and a conductor 430. The electric conductor 420 or the conductor 430 may have an aspect ratio of 4:5 or 5:4.

Figure 12:
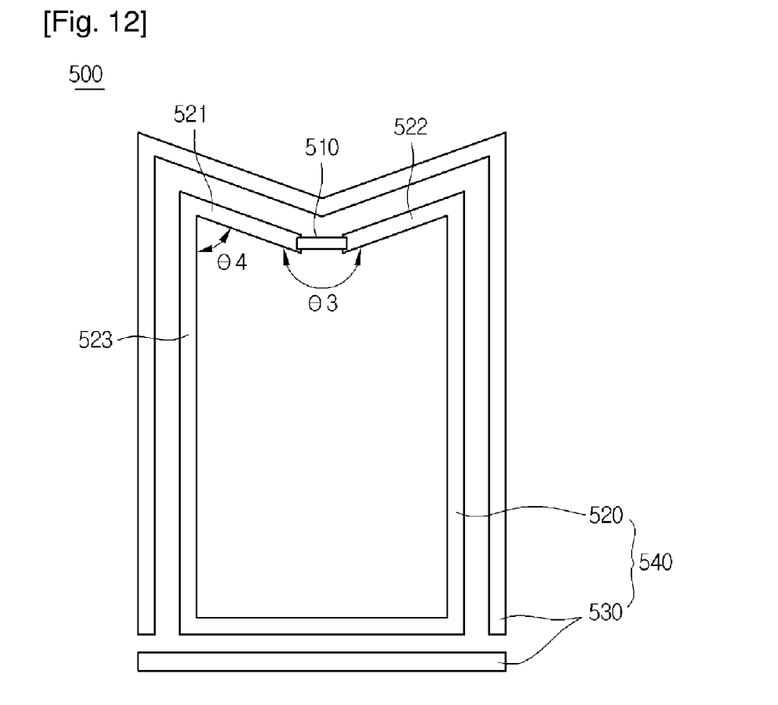

Referring to FIG. 12, an RFID tag 500 includes a semiconductor chip 510 and an antenna 540 having different internal angles. The antenna 540 includes an electric conductor 520 and a conductor 530. The electric conductor 520 includes first lines 521 and 522 making an angle θ3 with each other, and a second line 523 making an angle θ4 with the first line 521. The angle θ3 is equal to or larger than 180°, and the angle θ4 is less than 120°. For example, the angle θ3 can range from 180° to 300°, and the angle θ4 can range from 60° to 120°. The conductor 530 is formed in a outer side of the electric conductor 520 and has approximately the internal angles as the electric conductor 520.

Figure 13:
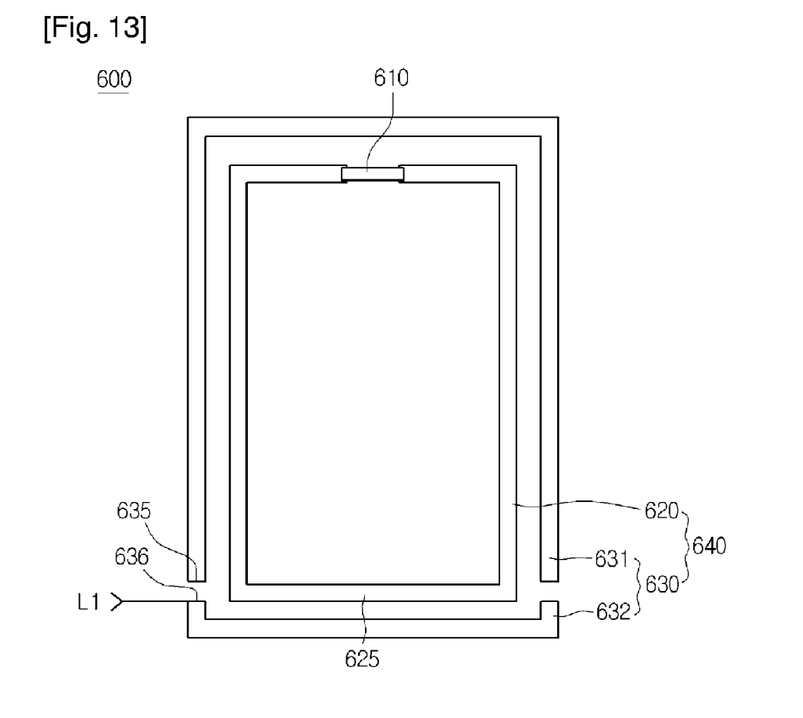

Referring to FIG. 13, an RFID tag 600 includes a semiconductor chip 610 and an antenna 640. The antenna 640 includes an electric conductor 620 and a conductor 630 formed in a outer side of the electric conductor 620. Both ends 636 of a second conductor 632 of the conductor 630 are bent toward both ends 635 of a first conductor 631 of the conductor 630. Alternatively, at least one end of the second conductor 632 is bent toward the first conductor 631. Both ends 636 of the second conductor 632 can be extended upward through a line L1 parallel with a third line 625 of the electric conductor 620.

According to the first embodiment and modification examples of the first embodiment, the antenna of the RFID tag includes an electric conductor and a conductor that are formed into a dual structure. Therefore, the RFID tag can have an isotropic radiation pattern by inductive coupling (or an mutual inductively coupled feeding method) between the electric conductor and the conductor.

Second Embodiment

Figure 14:
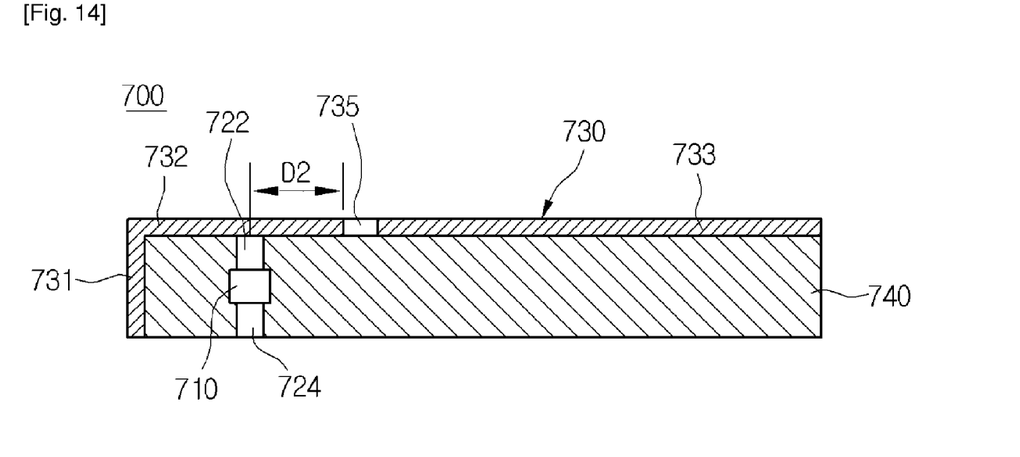
FIG. 14 is a sectional view illustrating an RFID tag according to a second embodiment.
Figure 15:
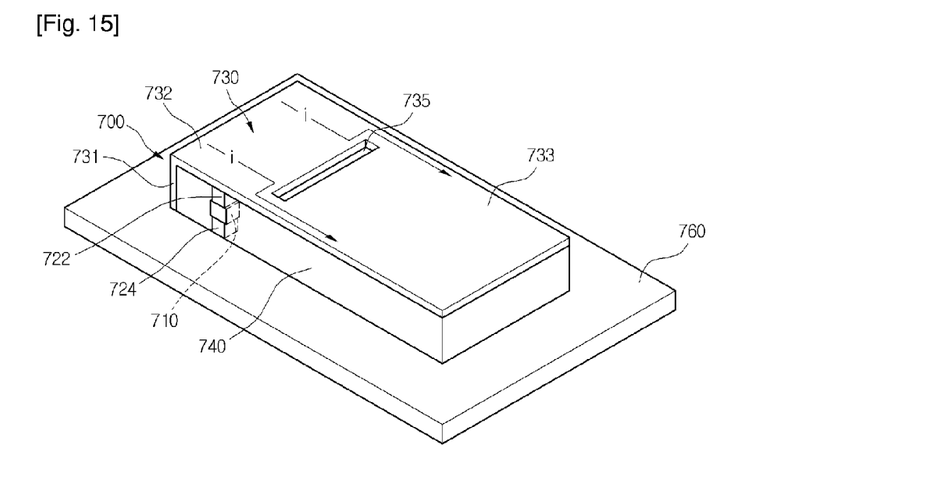
FIG. 15 is a perspective view illustrating an application example of an RFID tag according to a second embodiment.

FIGS. 14 and 15 illustrate a second embodiment. FIG. 14 is a sectional view illustrating an RFID tag according to a second embodiment, and FIG. 15 is a perspective view illustrating an application example of an RFID tag according to a second embodiment.

Referring to FIGS. 14 and 15, an RFID tag 700 includes a semiconductor chip 710 and an antenna 730, and a dielectric body 740.

The semiconductor chip 710 is disposed in the dielectric body 740 and is connected to first and second straps 722 and 724. The first strap 722 is connected to a backside of the antenna 730, and the second strap 724 is connected to the ground.

The semiconductor chip 710 can be easily installed since the semiconductor chip 710 is disposed inside the dielectric body 740. The dielectric body 740 may be formed of frame resistant 4 (FR-4).

The antenna 730 is formed on the dielectric body 740 in the form of a planar inverted F antenna (PIFA). For example, the antenna 730 may include an upper plate 732 and a lateral plate 731 bent from the upper plate 732. The lateral plate 731 has a height in the range of about 1 to 2 mm, and the upper plate 732 has an area of about 50*30 mm. The antenna 730 can have various sizes according to applications.

The antenna 730 may include at least one slot 735 in the upper plate 732 electrically connected to the semiconductor chip 710. The slot 735 is spaced apart from the semiconductor chip 710 by a predetermined distance D2.

The slot 735 of the antenna 730 is formed in the upper plate 732 in the form of a rectangular slot (or a straight slot) and is not extended out of the upper plate 732. The width of the slot 735 can be adjusted such that the capacitive impedance of the semiconductor 710 can be the complex conjugate of the inductive impedance of the antenna 730: (−jx, +jx).

The slot 735 may be formed in a direction perpendicular to a direction of a current flow or across the shortest path, thereby preventing a current from flowing along the shortest path. Since the antenna 730 includes the slot 735, the effective length (the electric length) of the antenna can be increased without increasing the size of the antenna 730. That is, the size of the antenna 730 can be reduced. In addition, the upper plate 732 in which the slot 735 is formed can be formed into a saw-toothed shape for size reduction.

A conductive plate 760 can be attached to a bottom surface of the RFID tag 700 as shown in FIG. 15. The conductive plate 760 may be formed of a metal material to a size larger than the upper plate 732.

In other words, the RFID tag 700 is mounted on the conductive plate 760. In this case, the first strap 722 connected to the semiconductor chip 710 is electrically connected to the conductive plate 760, and a bottom end of the lateral plate 731 is electrically connected to the conductive plate 760.

Although the antenna 730 of the RFID tag 700 is electrically connected to the conductive plate 760, the antenna 730 can normally operate.

The semiconductor chip 710 supplies a current to the antenna 730 when the RFID tag 700 communicates with an RFID reader. In the antenna 730, a current (i) flows around and away from the slot 735 in the upper plate 732.

Furthermore, since the slot 735 changes the path of a current in the antenna 730, the electric length (effective length) of the antenna 730 can be increases by the length of the slot 735. That is, the length of the antenna 730 can be reduced by the length of the slot 735. Therefore, the size of the RFID tag 700 can be reduced.

The RFID tag 700 of the second embodiment communicates with a reader using a predetermined short range wireless communication band. Here, the short range wireless communication range is the UHF band, for example, ranging from 860 to 950 MHz. Furthermore, the RFID tag 700 provides identification information to a reader through a wireless communication. The RFID tag 700 may be an active RFID tag 700 including a battery or a passive RFID tag not including a battery. In the latter case, the RFID tag 700 can operate using electric wave energy received from a reader.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation.

Therefore, the scope of the invention is defined not by the detailed description of the invention but by the appended claims, and all differences within the scope will be construed as being included in the present invention.

INDUSTRIAL APPLICABILITY

According to the RFID antenna and RFID tag of the exemplary embodiments of the present invention, the RFID tag does not have a null direction in which the RFID tag cannot communicate with a reader, and thus the RFID tag can be reliably applied to a product.

Furthermore, since the RFID antenna of the RFID tag is formed into a simple planar shape by printing, the RFID tag can be easily manufactured.

In addition, the RFID tag can be used with less restriction in installation position, so that an RFID system with the RFID tag can be conveniently and reliably used.

In addition, since the RFID antenna is formed with a slot, the size or length of the RFID antenna can be reduced.

Moreover, the RFID tag can be mounted even on a metal plate, thereby increasing the applicability of the RFID tag.

The invention claimed is:

1. A radio frequency identification antenna comprising:
   a closed loop shaped electric conductor to which electric power is supplied; and
   an open loop shaped conductor at an outer side of the electric conductor with no electric contact with the electric conductor,
   wherein the open low shaped conductor comprises:
   a first conductor formed along a line of the electric conductor extending from a feeding point of the electric conductor, and having at least one corner; and
   a second conductor electrically opened from the first conductor and formed along a line of the electric conductor distant from the feeding point of the electric conductor.

2. The radio frequency identification antenna according to claim 1, wherein the electric conductor and the open loop shaped conductor have a polygonal or elliptical shape.

3. The radio frequency identification antenna according to claim 1, wherein the electric conductor and the open loop shaped conductor are formed on the same plane.

4. The radio frequency identification antenna according to claim 1, wherein the electric conductor and the open loop shaped conductor have an isotropic radiation pattern by inductive coupling caused by a current supplied to the electric conductor.

5. The radio frequency identification antenna according to claim 1, wherein the open loop shaped conductor comprises a plurality of conductors electrically opened from each other at side corners distant from a feeding point of the electric conductor.

6. The radio frequency identification antenna according to claim 1, wherein the electric conductor or the open loop shaped conductor has at least one internal angle ranging from 60° to 320°.

7. A radio frequency identification tag comprising:
an antenna including a closed loop shaped electric conductor to which electric power is supplied and an open loop shaped conductor at an outer side of the electric conductor with no electric contact with the electric conductor; and
a semiconductor chip electrically connected to a feeding point of the electric conductor,
wherein the open loop shaped conductor comprises:
a first conductor formed with a space along an outside of a line of the electric conductor extending from the feeding point, and having, at least one corner; and
a second conductor electrically opened from the first conductor and formed with a space along an outside of a line of electric conductor distant from the feeding point.

8. The radio frequency identification tag according to claim 7, comprising a base member on which the electric conductor and the open loop shaped conductor are printed into a predetermined pattern at the same side.

9. The radio frequency identification tag according to claim 8, wherein the base member is formed of a material selected from the group consisting of polyethylene terephthalate (PET), polyimide (PI), polyethylene naphthalate (PEN), polyvinyl chloride (PVC), acetate, polyester, polyethylene, polypropylene, calcium carbonate, plastic, non-conductive material, and a combination thereof.

10. The radio frequency identification tag according to claim 7, wherein the electric conductor and the open loop shaped conductor are formed into a symmetric or asymmetric polygonal shape, or symmetric or asymmetric elliptical shape.

11. The radio frequency identification tag according to claim 7, wherein the antenna has an isotropic radiation pattern by inductive coupling between the electric conductor and the open loop shaped conductor caused by a current supplied to the electric conductor.

12. The radio frequency identification tag according to claim 7, wherein the RFID tag is an active or passive RFID tag operating in an UHF band.

* * * * *